United States Patent
Tsengas

(10) Patent No.: US 8,113,150 B1
(45) Date of Patent: Feb. 14, 2012

(54) INTERACTIVE PET TOY

(75) Inventor: Steven Tsengas, Fairport Harbor, OH (US)

(73) Assignee: OurPet's Co., Fairport Harbor, OH (US)

( * ) Notice: Subject to any disclaimer, the term of this patent is extended or adjusted under 35 U.S.C. 154(b) by 1099 days.

(21) Appl. No.: 11/223,551

(22) Filed: Sep. 9, 2005

Related U.S. Application Data

(60) Provisional application No. 60/663,412, filed on Mar. 21, 2005, provisional application No. 60/626,853, filed on Nov. 12, 2004, provisional application No. 60/608,458, filed on Sep. 10, 2004.

(51) Int. Cl.
*A01K 29/00* (2006.01)

(52) U.S. Cl. ......................... 119/711; 119/710

(58) Field of Classification Search ............... 119/711, 119/702, 707, 708, 709, 710; 446/175, 297, 446/397, 409; 473/570, 571; 273/153 R
See application file for complete search history.

(56) References Cited

U.S. PATENT DOCUMENTS

| | | | | |
|---|---|---|---|---|
| 4,513,014 A | * | 4/1985 | Edwards | 426/132 |
| 4,890,838 A | * | 1/1990 | Rudell et al. | 273/138.1 |
| D370,243 S | * | 5/1996 | Thompson | D21/707 |
| 5,912,285 A | * | 6/1999 | Godsey | 524/17 |
| 6,126,053 A | * | 10/2000 | Shaver | 224/509 |
| 6,405,682 B1 | * | 6/2002 | Simon | 119/707 |
| 6,415,741 B2 | * | 7/2002 | Suchowski et al. | 119/711 |
| 6,470,830 B2 | * | 10/2002 | Mann | 119/709 |
| 6,578,527 B1 | * | 6/2003 | Mathers | 119/707 |

* cited by examiner

*Primary Examiner* — T. Nguyen
(74) *Attorney, Agent, or Firm* — John D. Gugliotta, PE, Esq

(57) ABSTRACT

A pet toy is provided having an interactive stimulus that actively engages the pet's senses during use. Stimuli include sight, sounds, smell, taste, and sound, and can include a combination of more than one such stimulus.

9 Claims, 3 Drawing Sheets

INTERACTIVE PET TOY

RELATED APPLICATIONS

The present invention contains subject matter that was first described in, and claim the benefit of, U.S. Provisional Patent No. 60/608,458, filed on Sep. 10, 2004, U.S. Provisional Patent No. 60/626,853 filed on Nov. 12, 2004, and U.S. Provisional Patent No. 60/663,412, filed on Mar. 21, 2005. All applications are incorporated by reference herein as if fully rewritten.

BACKGROUND OF THE INVENTION

1. Field of the Invention

The present invention relates generally to a pet toy and, more particularly, to a pet toy having an interactive stimulus that actively engages the pet's senses during use.

2. Description of the Related Art

There are many available pet toys on the market, including toys that are intended for use as an object that the pet engages and chases. Most use various visual stimulus, such as shapes, ridges, and differing colors to provide visual attractants or stimuli to create interest by the pet in the toy. However, it has been found that by engaging additional senses, a pet toy can provide more entertainment to the pet and the owner.

One such type of interactive toy including pet toys that dispense treats upon rolling or movement of the toy. However, these toys provide for the insertion of the treats into cavities within the toy and for dispensing based on movement or rotation of the toy. The present invention is markedly different by providing a spherical pet toy having either a gripping means in which at least one consumable pet treat is inserted and held until extracted by the pet, or an audible stimulus that is engaged by movement of the toy, or both. The physical stimuli of an embedded food item utilizes sight, smell and taste to ultimately provide exercise to the muscles, strengthens teeth and gums, and extracts harmful plaque from the teeth of a pet, as well as. The audible stimuli of sound can be used additionally to engage the instinctive response from many breeds of cats or dogs.

These, among other disclosed advantages and features, overcome many of the deficiencies outlined and inherent within the known prior art.

SUMMARY OF THE INVENTION

It is therefore an object of the present invention to provide an improved a pet toy having an interactive stimulus that actively engages the pet's senses during use.

It is a feature of the present invention to provide an improved pet toy having a gripping means in which at least one consumable pet treat is inserted and held until extracted by the pet.

It is a further feature of the present invention to provide an audible stimulus that is engaged by movement of the toy.

Briefly described according to one embodiment of the present invention, a pet toy is provided having a spherical body forming a plurality of resilient rib pairs (an upper rib opposed to a lower rib), in which an interstitial space formed between said ribs. This interstitial space holds at least one consumable pet treat between said resilient ribs. The physical stimuli of an embedded food item utilizes sight, smell and taste to ultimately provide exercise to the muscles, strengthens teeth and gums, and extracts harmful plaque from the teeth of a pet, as well as.

In an alternate embodiment of the present invention, audible stimuli of sound can be used additionally to engage the instinctive response from many breeds of cats or dogs. The spherical body of such an embodiment encloses a sound module enclosed and forms a plurality of apertures in said body for transmitting sound generated by said sound module. In either embodiment, it is anticipated that if being directed toward canine pets some sort of exoskeleton enclosing the spherical body would be beneficial to provide a protective barrier to prevent the animal from accessing the sound module enclosed therein.

An advantage of the present invention is that the use of a gripping means in which at least one consumable pet treat is inserted and held until extracted by the pet requires more vigorous interaction by the pet in order to access the treat. This vigour provide exercise to the muscles, strengthens teeth and gums, and extracts harmful plaque from the teeth of a pet, as well as.

Another advantage of the present invention is that the use of audible stimuli of sound can be used additionally to engage the instinctive response from many breeds of cats or dogs. This sound can be further customized to target specific instinctive responses for various particular breeds.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

Figure 1:
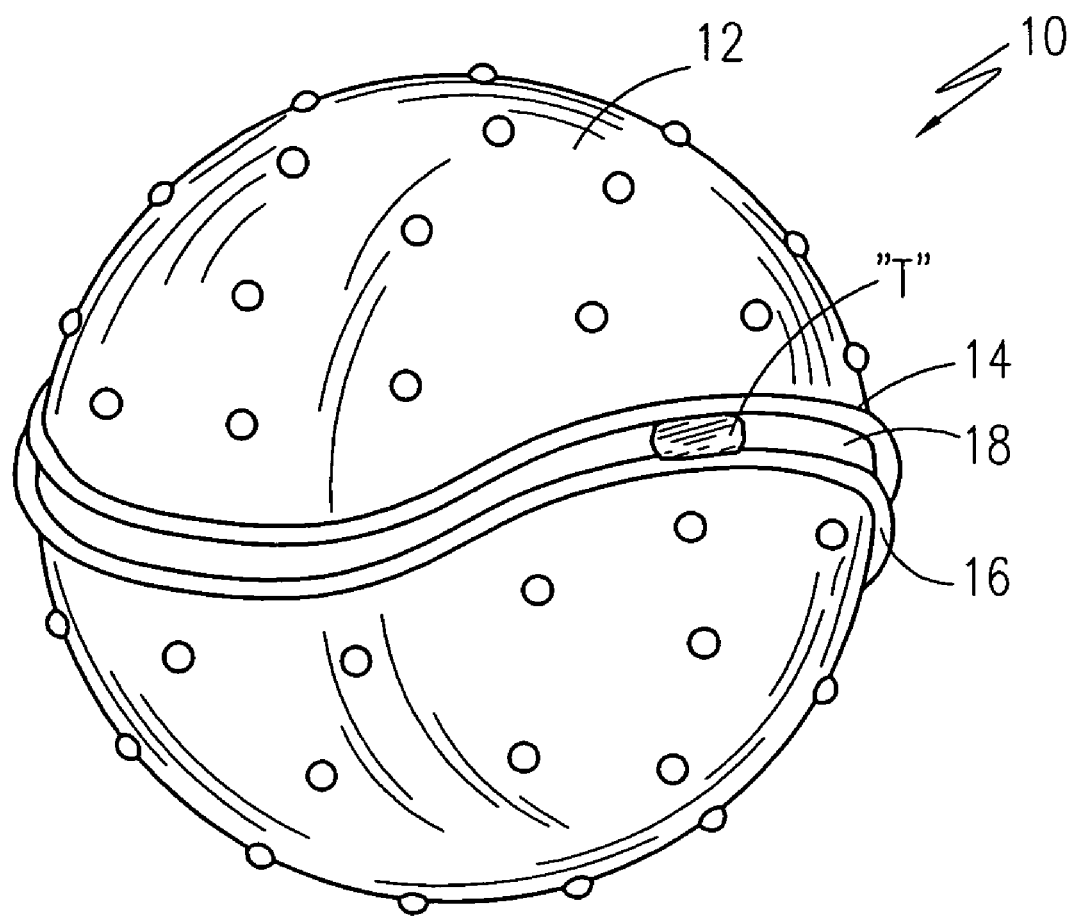
FIG. 1 is a perspective view of an interactive pet toy according to a first embodiment of the present invention.

The best mode for carrying out the invention is presented in terms of its preferred embodiment, herein depicted within the Figures 1. Detailed Description of the Figures Referring now to FIG. 1, a pet toy for holding consumable treats 10 is depicted in accordance with a preferred embodiment of the present invention. The toy 10 comprises a spherical body 12 having an ring 14, the ring 14 having an upper rib 16 and an lower rib 18, the ribs 16 and 18 forming an interstitial space 20 therebetween for holding a consumable pet treat "T". The upper rib 16 is a single, continuous rib circumscribing the innermost portion of the ring 14. The lower rib 18 is a single, continuous rib circumscribing the outermost portion of the ring 14. The interstitial space 20 formed between the ribs 16 and 18 is likewise a single, continuous space circumscribing the area between the ribs 16 and 18. The space 20 accommodates the placement of at least one treat "T" and may accommodate a plurality of treats "T" along the circumference of the ring 14. The toy 10 may also include a plurality of nodules 20 along the surface of the body 12. The nodules 20 provide improved grasping of the toy 10 by pet and owner.

The toy 10 is preferably manufactured via molding techniques used for plastics and rubbers, from an elastomeric product (such as thermoset or thermoplastic high tear strength material, thermoplastic elastomers and/or natural rubber). It is envisioned that the toy 10 is manufactured from a material having a specific gravity less than 1.0 so that the toy 10 is buoyant in an aqueous liquid. An aroma, oil or juice may be molded with or impregnated into the material during manufacture, thereby providing olfactory stimulation to the pet. Either separately, or in combination with the consumable treat "T", the aroma, oil or juice functions as an attractant to the pet to engage in chewing, chasing and retrieving exercises.

The toy 10 is an effective training device for a pet, especially canines. The toy 10 may be employed as a retrieval toy that the canine may chase, retrieve and return to the owner. Because of the ribs 16 and 18 and interstitial space 20 provided, consumable treats "T" (such as appropriately proportioned food, kibble or treats) may be inserted therein, thus providing an incentive and reward to retrieve and/or obey commands. By impinging the treats "T" within the ribs 16 and 18 and space 20, the pet must exert energy to retrieve the treats "T", exercise jaw and head muscles, using the teeth and gums, thus the exercise in extracting the treat "T" from the toy 10 exercises muscles of the head and neck, and strengthens teeth and gums, and removes harmful plaque from the teeth and gumlines.

The toy 10 is envisioned as being adaptable for manufacture directed to variously sized animals, including the various breeds of canines. Thus, the toy 10 may be manufactured in sizes for small breeds, medium size breeds and large breeds, respectively. It is envisioned that the diameters may vary in a range from four inches to twelve inches. Likewise, the toy 10 is envisioned as being manufactured in a variety of colors and/or with a variety of design configurations on the surface of the toy 10. The toy 10 may have a solid structure or a hollow interior, depending upon the cost effectiveness and ease of manufacturing the toy 10. Furthermore, the toy 10 may have a solid structure for greater durability. The toy 10 may have a hollow structure for greater flexibility and pliability, appropriate for chewing and gnawing by a pet.

Figure 2:
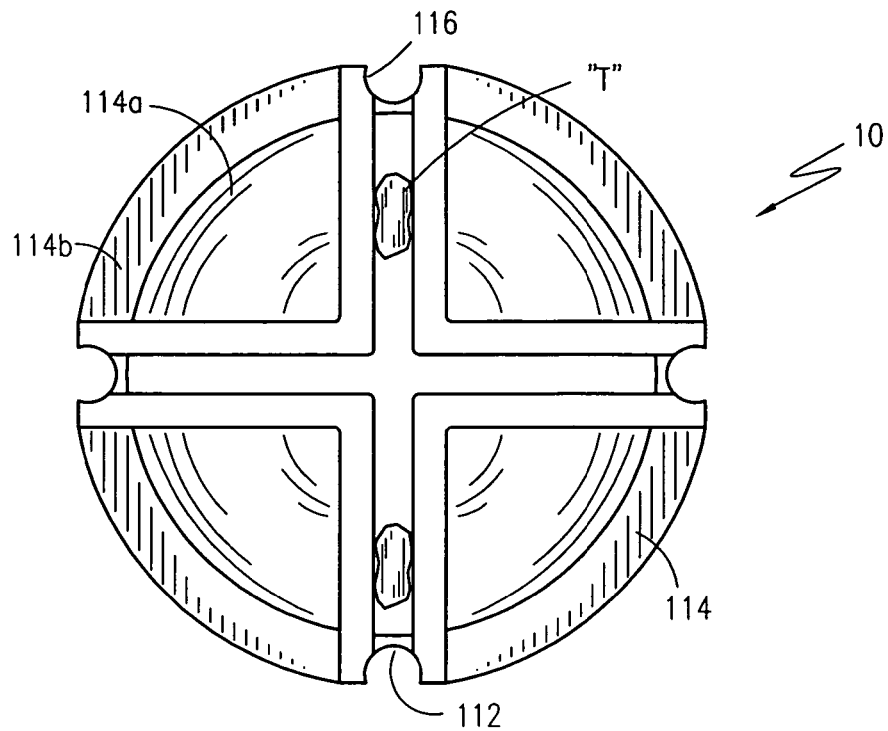
FIG. 2 is a front or side view of an interactive pet toy according to a first alternate embodiment of the present invention.

Referring now to FIG. 2, one aspect of the present invention is depicted in accordance with a first alternate embodiment in which a pet toy 10 comprises an inner body 112 having a polygonal shape, an open-cell exoskeleton 114 enclosing said inner body 112, and at least one channel 116 formed in the open-cell exoskeleton 114 for retaining a consumable treat "T".

Figure 3:
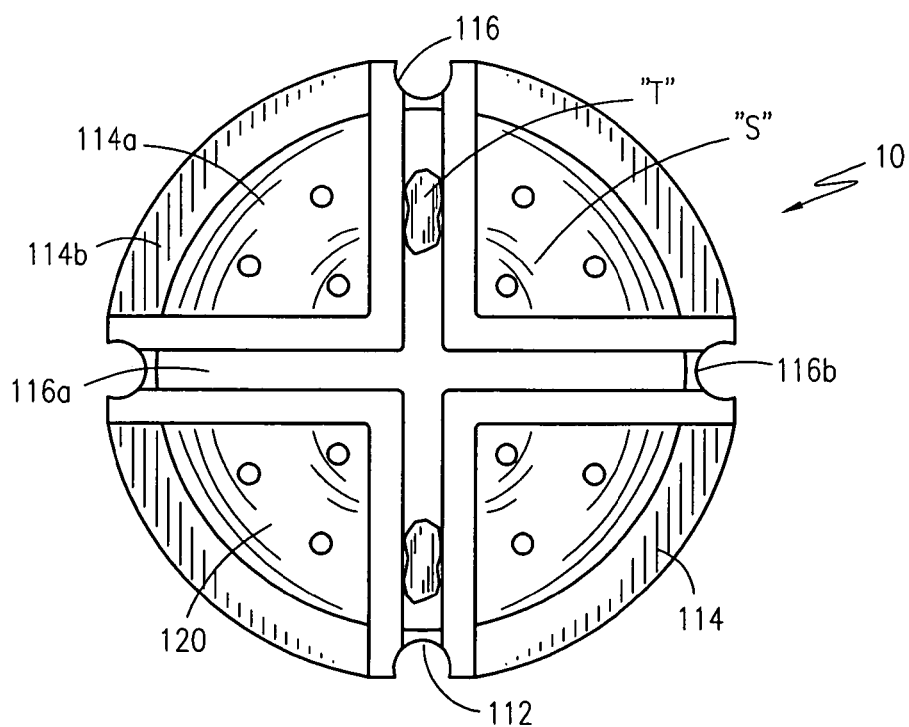
FIG. 3 is front or side view of an interactive pet toy according to a second alternate embodiment of the present invention.
Figure 4:
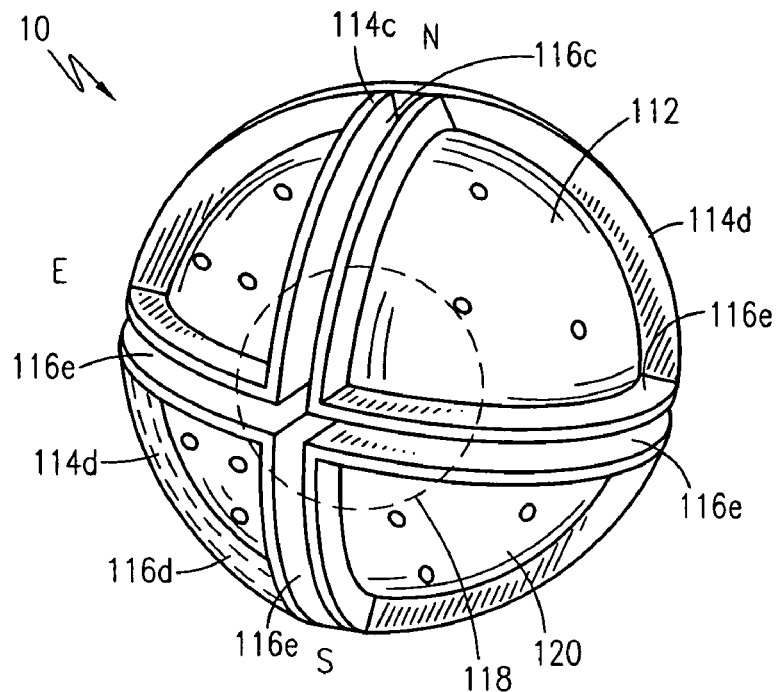
FIG. 4 is a perspective view of an interactive pet toy according to a third alternate embodiment of the present invention; is a perspective view of the pet toy.
Figure 5:
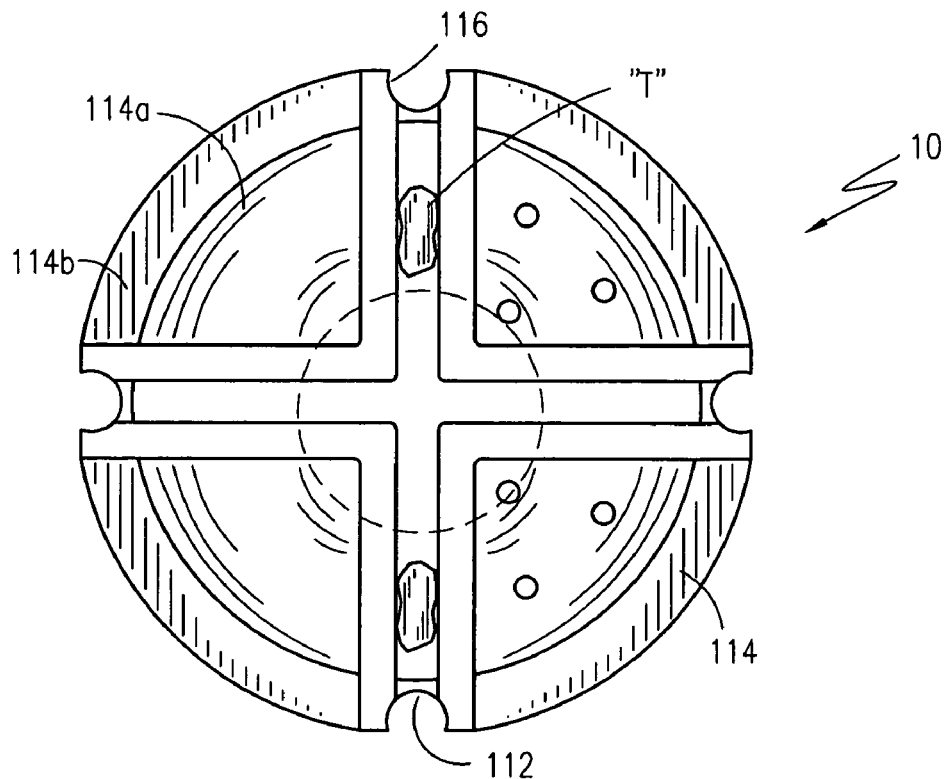
FIG. 5 is a front or side view of front or side view of an interactive pet toy according to a fourth alternate embodiment of the present invention.

In conjunction with FIG. 3 and FIG. 4, an alternate aspect of the present invention is depicted in accordance with a second and third alternate embodiments in which a pet toy 10 comprises an inner body 112 having a polygonal shape, a sound module 118 enclosed in the inner body 112, a plurality of apertures 120 formed in the inner body 112 for transmitting sound "S" generated by the sound module 118, an open-cell exoskeleton 114 enclosing the inner body 112, and at least one channel 116 formed in the open-cell exoskeleton 114 for retaining a consumable treat "T".

Generally, the pet toy 10 may have one of many polygonal shapes or forms, including spherical, prolate (cigar or football shaped), orthogonal, pentagonal, hexagonal, etc. It is envisioned that the preferred form or shape has the ability to roll or tumble when urged by the pet owner or the pet. In the case of the orthogonal, pentagonal, hexagonal or other similar shapes or forms, it is envisioned that the ability to roll or tumble will be enhanced if the corners or edges of the pet toy 10) are rounded so that less force is required to urge the pet toy 10 into a rolling or tumbling course.

As indicated in reference to the pet toy 10 above, the inner body 112 may have one of the polygonal shapes or forms identified. The inner body 112 may be manufactured from a variety of materials, including any suitable polymer/elastomer (such as polyolefin elastomers), plastic, rubber and other similar materials that are durable, resilient and flexible.

The inner body 112 may be provided in a variety of colors. It is envisioned that the inner body 112 should be a color differing from the open-cell exoskeleton 114, discussed below, so that as the pet toy 10 is rolled, an optical stimulant or attractant is provided. The pet toy 10 is envisioned as being provided in a range of sizes to accommodate small pets to very large pets. Particularly, the diameter of the pet toy 10 is envisioned as being in a range so that the smallest diameter of the pet toy 10 cannot be swallowed by the intended pet, and the largest diameter of the pet toy 10 is not too large for the intended pet to enjoy or engage. Thus, the diameter of the pet toy 10 is considered to be in the range of one inch to twenty inches, and will typically be in the range of four inches to twelve inches.

It is further envisioned that the inner body 112 houses a sound module 118 within a space formed in the interior of the inner body 112. The sound module 118 generates sound in response to movement of the pet toy 10. In one embodiment the sound module 118 has a sound chip and a source of electrical power (such as an integral battery), and the sound chip emits a prerecorded sound in response to the commencement or movement and/or the continuation of movement of the pet toy 110 having the prerecorded sound chip housed therein. Obviously, other mechanical versions of the sound module 118 are contemplated, such as a sound module 118 that generates sound via mechanical means, such as tumbling or shifting of the sound module 118 or its contents (such as beads or metal balls) within the interior space of the inner body 112. Other variations of the sound module 118 are envisioned, thus the particular nature of the sound module 118 is not considered a limitation on the spirit and scope of the present invention.

It is further envisioned that the inner body 112 has a plurality of apertures 120 formed in the inner body 112 for transmitting the sound generated by the sound module 118 from the interior of the inner body 112 to the exterior of the inner body 112 so that the sound is more easily perceived by the pet during use. The sound module 118 and apertures 120 cooperatively provide an audible stimulant to the pet during usage, thereby enhancing the attractiveness of the pet toy 10 generally, and stimulating engagement of the pet to the pet toy 10. It is envisioned that a minimum number of apertures 120 are provided to sufficiently transmit the sound from the sound module 118. The size and placement of the apertures 120) is variable, so long as the aperture 120 number and/or size sufficiently transmits the sound generated by the sound module 118. In one envisioned embodiment, the sound module 118 may include a prerecorded sound chip of the form and function found in U.S. Pat. No. 6,371,053, issued in the name of the present inventor, the patent specification and claims being incorporated by reference herein as if fully rewritten in its entirety The prerecorded sound chip thereby emits a prerecorded sound in response to one or both of the commencement and continuation of movement of the pet toy 10.

Referring now to FIG. 4, a third alternate embodiment of the present invention is disclosed in which the open-cell exoskeleton 114 is anticipated as having a general form complimentary to the inner body 112. For example, if the inner body 112 is spherical in form, the open-cell exoskeleton 114 is generally spherical in form, excepting the portions of the open-cell exoskeleton 114 that are identified as the open-cell 114b portion, discussed in greater detail below. The open-cell exoskeleton 114 comprises an exoskeleton 114a portion and an open-cell 114b portion. As depicted, and by way of example only, the exoskeleton 114a may be described as having three planes (114c, 114d and 114e, respectively). Arbitrarily assigning the inner body 112 (here, spherical in shape) a north pole (N), a south pole "S" and an equator (E), one may observe that two planes (114c and 114d) are longitudinally oriented, are spaced approximately ninety-degrees in the longitudinal orientation at "E" and intersect at (N) and "S". The third plane 114e is latitudinally oriented, com"rising the equatorial plane "E", and intersecting with the other planes (114c and 114d) about "E" approximately every ninety-degrees. The exoskeleton 114a generally encompasses, encircles, encloses or otherwise circumscribes the inner body 112. In this respect, the relationship of the inner body 112 to the open-cell exoskeleton 114, and particularly to the exoskeleton 114b may be thought of as the inner body 112 being the "inner portion" of the pet toy 10 and the open-cell exoskeleton 114 being the "outer portion" of the pet toy 10, respectively. The open-cell 114b portion is provided for several purposes, which includes providing unfettered audible access to the apertures 120 formed on the inner body 112, and allowing for non-linear movement of the pet toy 10 when used by the pet.

The open-cell exoskeleton 114, and the exoskeleton 114a portion in particular, has at least one channel 116 formed in the exoskeleton 114a portion for retaining a consumable pet treat "T". In a single channel 116 embodiment, the channel 116 may be formed at any portion of the open-cell exoskeleton 114. It is envisioned that a multi-channel embodiment (116a and 116b, for example) may be desirable as well, positioned specifically or randomly along the exoskeleton 114a portion. In the embodiment depicted, by way of example only, a channel is formed along each of the three planes (114c, 114d and 114e), so that a single channel 116c corresponds to the plane 114c, a single channel 116d corresponds to the plane 114d, and a single channel 116e corresponds to the plane 114e. It is envisioned that the single channels (116c, 116d and 116e, respectively) circumscribe the individual planes (114c, 114d and 114e, respectively). The use of a plurality of consumable pet treats "T" is envisioned with the multi-channel embodiment, or in the tri-channel embodiment described in which the channels circumscribe the planes.

It is further envisioned that either the inner body 112 or the open-cell exoskeleton 114, or both elements, may be provided with a scent and/or flavor component to provide an olfactory attractant. For instance, a scent and/or flavor may be impregnated into the inner body 112 and/or the open-cell exoskeleton 114. As the pet engages or chews the toy, scent and/or flavor may be released from the inner body 112 and/or open-cell exoskeleton 114. Other methods for imparting a scent or flavor into the inner body 112 or open-cell exoskeleton 114 are also contemplated.

2. Operation of the Preferred Embodiment

In operation, the present invention is used as an otherwise conventional pet toy, but engages additional senses of the pet to provide more entertainment to the pet and the owner. Insertion of the treats into cavities within the toy are held until extracted by the pet. The audible stimulus is engaged by movement of the toy. The physical stimuli of an embedded food item utilizes sight, smell and taste to ultimately provide exercise to the muscles, strengthens teeth and gums, and extracts harmful plaque from the teeth of a pet, as well as. The audible stimuli of sound can be used additionally to engage the instinctive response from many breeds of cats or dogs.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. Therefore, the scope of the invention is to be limited only by the following claims.

Having thus described the invention what is claimed as new and desired to be secured by Letters Patent is as follows:

1. A pet toy having an interactive stimulus that actively engages a pet's senses when tossed and rolled said pet toy comprising:
    a spherical outer body that forms a hollow inner body, said outer body is a plastic or a rubber material impregnated with an aroma, an oil or a juice during said outer body's manufacture by means of a molding technique, wherein said outer body has an overall outer diameter from one inch to twenty inches;
    at least one interactive stimulus means to stimulate said pet's senses selected from the group comprising sight, smell, sound;
    an open-cell exoskeleton encloses said spherical outer body; and
    wherein said outer body further comprises at least one resiliant, gripping means for holding a consumable pet treat and forming at least on channel formed in the open-cell exoskeleton for retaining a consumable treat.

2. The pet toy of claim 1, further comprising a sound module enclosed within said inner body, said sound module forming a plurality of apertures formed in said inner body for transmitting sound generated by said sound module.

3. The pet toy of claim 1, wherein said spherical outer body may stretch to form a different shape or a plurality of edges and vertices formed on said spherical outer body provides a means for said outer body to be polygonal shaped.

4. The pet toy of claim 1, wherein said outer body further comprises corners or edges that are rounded so that less force is required to urge the pet toy into a rolling or rumbling course.

5. The pet tot of claim 2, wherein said sound module generates sound in response to movement of the pet toy.

6. The pet toy of claim 5, wherein said sound module comprises a sound chip and a source of electrical power, said sound chip being capable of emitting a prerecorded sound in response to the commencement or movement and/or the continuation of movement of the pet toy.

7. The pet toy of claim 2, wherein said sound module generates sound via mechanical means, such as tumbling or shifting of the sound module or its contents within an interior space of the inner body.

8. The pet toy of claim 1, wherein said open-cell exoskeleton has a general form complimentary to said outer body.

9. The pet toy of claim 1, wherein either said inner body, said open-cell exoskeleton, or both are provided with a scent and/or flavor component to provide an olfactory attractant;
    wherein as a pet engages or chews said toy, scent and/or flavor may be released from the inner body and/or open-cell exoskeleton.

* * * * *